United States Patent
Herron et al.

(10) Patent No.: US 11,423,715 B1
(45) Date of Patent: Aug. 23, 2022

(54) VEHICLE DIAGNOSTIC DEVICE

(71) Applicant: Opus IVS, Inc., Ann Arbor, MI (US)

(72) Inventors: Brian J. Herron, Dexter, MI (US);
Andrew D. Betteley, Buckinghamshire (GB); Mark W. Wine, Ann Arbor, MI (US)

(73) Assignee: Opus IVS, Inc., Ann Arbor, MI (US)

( * ) Notice: Subject to any disclaimer, the term of this patent is extended or adjusted under 35 U.S.C. 154(b) by 176 days.

(21) Appl. No.: 16/701,967

(22) Filed: Dec. 3, 2019

(51) Int. Cl.
*G07C 5/08* (2006.01)
*G07C 5/00* (2006.01)
*G06F 1/16* (2006.01)

(52) U.S. Cl.
CPC ......... *G07C 5/0808* (2013.01); *G06F 1/1613* (2013.01); *G07C 5/008* (2013.01); *G06F 2213/0042* (2013.01); *G07C 2205/02* (2013.01)

(58) Field of Classification Search
CPC .. G07C 5/0808; G07C 5/008; G07C 2205/02; G06F 1/1613; G06F 2213/0042
See application file for complete search history.

(56) References Cited

U.S. PATENT DOCUMENTS

| | | | |
|---|---|---|---|
| 6,154,658 | A | 11/2000 | Caci |
| 6,728,603 | B2 | 4/2004 | Pruzan et al. |
| 6,879,894 | B1 | 4/2005 | Lightner et al. |
| 6,956,501 | B2 | 10/2005 | Kitson |
| 7,092,803 | B2 | 8/2006 | Kapolka et al. |
| 7,373,226 | B1 | 5/2008 | Cancilla et al. |
| 7,502,672 | B1 | 3/2009 | Kolls |
| 7,519,458 | B2 | 4/2009 | Buckley |
| 7,532,962 | B1 | 5/2009 | Lowrey et al. |

(Continued)

FOREIGN PATENT DOCUMENTS

WO  2004092857 A2  10/2004

OTHER PUBLICATIONS

Article entitled "Remote Vehicle Diagnostic System Using Mobile Handsets" by Doo-Hee Jung, Gu-Min Jeong, and Hyun-Sik Ahn, understood to be from the proceedings of the Jun. 2006 International Conference on Wireless Networks, ICWN 2006, Las Vegas, Nevada.

(Continued)

*Primary Examiner* — Michael V Kerrigan
(74) *Attorney, Agent, or Firm* — Gardner, Linn, Burkhart & Ondersma LLP

(57) ABSTRACT

A vehicle diagnostic device for use in diagnosing, scanning and programming an electrical system of a vehicle having a housing, a computer with a screen disposed within the housing with the screen being disposed at an opening of the housing. The vehicle diagnostic device further includes a circuit board configured to operate as a SAE J2534 pass-thru device and disposed within the housing, with the circuit board including a multi-pin connector disposed at an aperture of the housing. A cable connects the computer and circuit board for communications there between. The circuit board is configured to receive vehicle data signals from a vehicle via the connector and convert the vehicle data signals for transmission to the computer via the cable. The computer is further configured to transmit signals to the circuit board via the cable for conversion by the circuit board to vehicle data signals for transmission via the connector to the vehicle.

20 Claims, 10 Drawing Sheets

(56) References Cited

U.S. PATENT DOCUMENTS

| | | |
|---|---|---|
| 7,584,030 B1 | 9/2009 | Graham |
| 7,786,851 B2 | 8/2010 | Drew et al. |
| 7,840,812 B1 | 11/2010 | Levenberg |
| 7,928,837 B2 | 4/2011 | Drew et al. |
| 8,190,322 B2 | 5/2012 | Lin et al. |
| 8,259,936 B2 | 9/2012 | Mahalingaiah |
| 8,306,687 B2 | 11/2012 | Chen |
| 8,339,254 B2 | 12/2012 | Drew et al. |
| 8,352,577 B2 | 1/2013 | Martone |
| 8,638,207 B2 | 1/2014 | Drew et al. |
| 8,688,313 B2 | 4/2014 | Margol et al. |
| 8,909,416 B2 | 12/2014 | Chen et al. |
| 8,918,245 B2 | 12/2014 | Dewhurst et al. |
| 9,430,884 B2 | 8/2016 | Drew et al. |
| 9,530,255 B2 | 12/2016 | Drew et al. |
| 9,563,988 B2 | 2/2017 | Drew et al. |
| 9,646,130 B2 | 5/2017 | Drew et al. |
| 10,013,816 B2 | 7/2018 | Nassar et al. |
| 10,146,521 B2 | 12/2018 | West et al. |
| 10,181,225 B2 | 1/2019 | Liebl et al. |
| 10,282,924 B2 | 5/2019 | Drew et al. |
| 10,414,277 B1 | 9/2019 | Herron et al. |
| 10,445,953 B1 | 10/2019 | Herron et al. |
| 10,706,645 B1 | 7/2020 | Herron et al. |
| 10,719,813 B1 | 7/2020 | Beckmann et al. |
| 10,748,356 B1 | 8/2020 | Herron et al. |
| 11,062,534 B2 | 7/2021 | Jingle et al. |
| 2001/0056544 A1 | 12/2001 | Walker |
| 2003/0001720 A1 | 1/2003 | Wade et al. |
| 2003/0020759 A1 | 1/2003 | Cancilla et al. |
| 2004/0044454 A1 | 3/2004 | Ross et al. |
| 2004/0167689 A1 | 8/2004 | Bromley et al. |
| 2005/0021294 A1 | 1/2005 | Trsar et al. |
| 2005/0038581 A1 | 2/2005 | Kapolka et al. |
| 2005/0060070 A1 | 3/2005 | Kapolka et al. |
| 2005/0182537 A1 | 8/2005 | Tefft et al. |
| 2005/0240555 A1 | 10/2005 | Wilde et al. |
| 2005/0251304 A1 | 11/2005 | Cancellara et al. |
| 2006/0052921 A1 | 3/2006 | Bodin et al. |
| 2006/0106508 A1 | 5/2006 | Liebl et al. |
| 2006/0211446 A1 | 9/2006 | Wittmann et al. |
| 2007/0005201 A1 | 1/2007 | Chenn |
| 2007/0043488 A1 | 2/2007 | Avery et al. |
| 2007/0050105 A1 | 3/2007 | Chinnadurai et al. |
| 2007/0055420 A1 | 3/2007 | Krzystofczyk et al. |
| 2007/0073460 A1 | 3/2007 | Bertosa et al. |
| 2007/0167039 A1* | 7/2007 | Wu ................ G06F 1/1656 439/76.1 |
| 2007/0185624 A1 | 8/2007 | Duddles et al. |
| 2007/0233340 A1 | 10/2007 | Raichle et al. |
| 2008/0177438 A1 | 7/2008 | Chen et al. |
| 2008/0269975 A1 | 10/2008 | Bertosa |
| 2008/0280602 A1 | 11/2008 | Ban |
| 2008/0306645 A1 | 12/2008 | Dewhurst et al. |
| 2009/0062978 A1 | 3/2009 | Picard |
| 2009/0118899 A1 | 5/2009 | Carlson |
| 2009/0119657 A1 | 5/2009 | Link, II |
| 2009/0187976 A1 | 7/2009 | Perroud et al. |
| 2009/0265055 A1 | 10/2009 | Gillies |
| 2009/0276115 A1 | 11/2009 | Chen |
| 2010/0042287 A1 | 2/2010 | Zhang |
| 2010/0174446 A1 | 7/2010 | Andreasen et al. |
| 2010/0204878 A1 | 8/2010 | Drew et al. |
| 2010/0205450 A1 | 8/2010 | Samacke et al. |
| 2010/0262335 A1 | 10/2010 | Brozovich |
| 2011/0071709 A1 | 3/2011 | Damiani et al. |
| 2011/0112718 A1 | 5/2011 | Claus et al. |
| 2011/0153150 A1 | 6/2011 | Drew et al. |
| 2011/0276218 A1 | 11/2011 | Dwan |
| 2011/0313593 A1 | 12/2011 | Cohen et al. |
| 2012/0046826 A1 | 2/2012 | Panko |
| 2012/0254345 A1 | 10/2012 | Montoya |
| 2014/0277922 A1* | 9/2014 | Chinnadurai ........ G07C 5/0808 701/33.2 |
| 2016/0070559 A1* | 3/2016 | West .................. G06F 8/65 717/172 |
| 2017/0301154 A1 | 10/2017 | Rozint |
| 2020/0328910 A1* | 10/2020 | Peng ................ H04L 43/50 |

OTHER PUBLICATIONS

Thesis entitled "Remote Connection of Diagnostic Tool" by Irina Elena Apetri and Ali Raza, Chalmers University of Technology, dated 2011.

\* cited by examiner

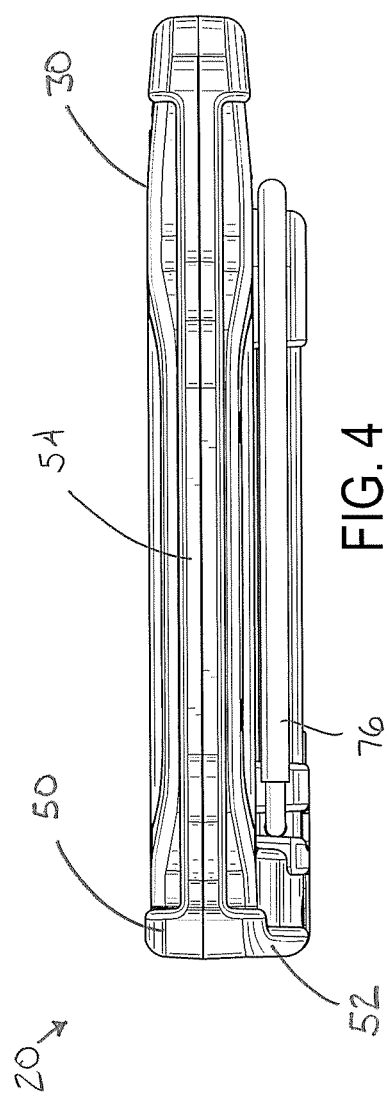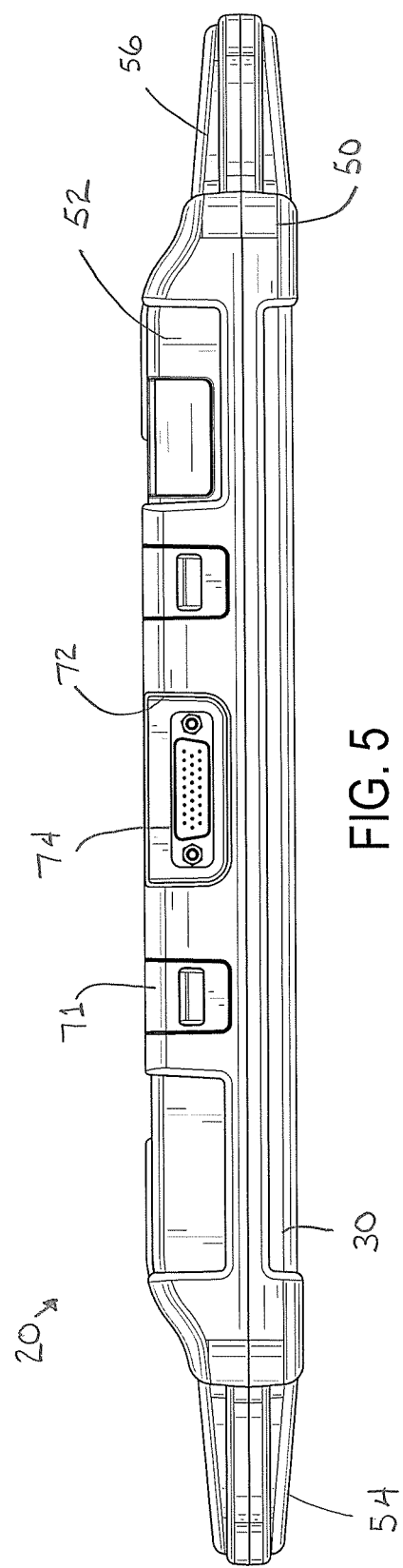

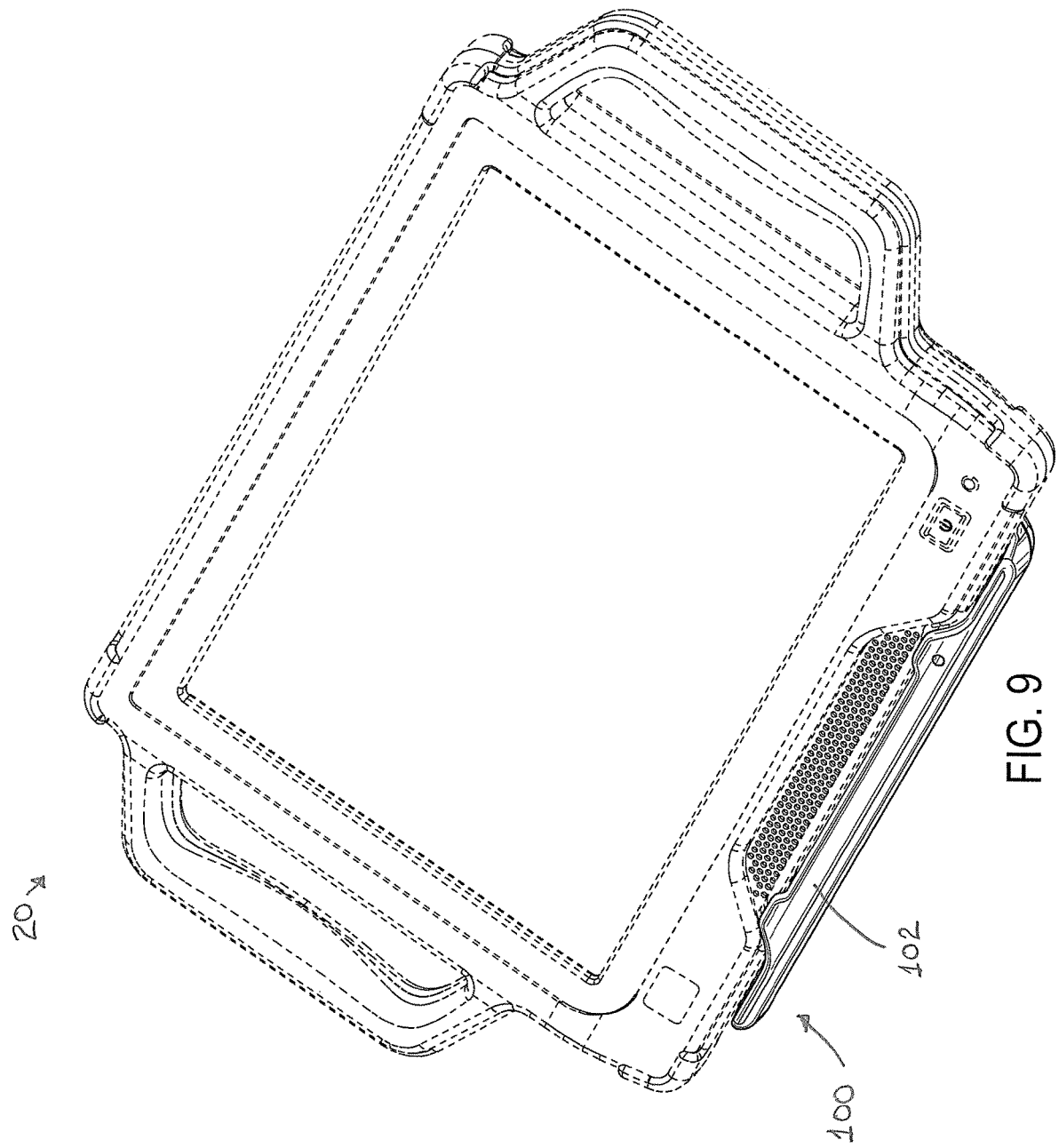

VEHICLE DIAGNOSTIC DEVICE

BACKGROUND AND FIELD OF THE INVENTION

The present invention is directed to a vehicle diagnostic device, and in particular a portable integrated vehicle diagnostic tool including a computer and a separate J2534 pass-thru computer module.

In automotive repair garages, many of the tools used to diagnose and repair cars have transitioned to computer-based systems. Vehicle diagnostic systems employing diagnostic scan devices or tools are used in automotive repair facilities to diagnose and repair computer-based vehicle systems, where vehicles may have differing computer-based systems depending on the configuration and options installed on the vehicle. Vehicle diagnostic scan systems may include or use one or more diagnostic software scanning programs or applications, such as applications developed by an original equipment automotive manufacturer ("OEM"), or an aftermarket diagnostic company. The diagnostic software scanning programs are used to diagnose the electronic system of a vehicle.

Repair facilities must diagnose the electronic computer systems of vehicles, including scanning and reprogramming electronic control units of the vehicle electronic computer systems as needed for software updates and/or repairs. Repair facilities may obtain equipment so as to be able to perform such diagnostic operations, including by way of pass through interface devices that operate according to the SAE J2534 standard, and local computers utilizing diagnostic software applications for use in scanning, diagnosing and reprogramming the vehicle. Repair facilities may also obtain alternative equipment whereby diagnostic and reprograming operations are facilitated via remote diagnostic computer systems utilizing diagnostic software applications, in which case the vehicle will be connected with electronic equipment to facilitate the transmission of vehicle data via the Internet.

SUMMARY OF THE INVENTION

The present invention provides a vehicle diagnostic device for diagnosing, scanning and programming an electrical system of a vehicle. According to an aspect of the present invention, a vehicle diagnostic device includes a housing, a computer having a screen and a computer processor, with the computer disposed within the housing and the housing including a screen opening for the computer screen. A circuit board is additionally disposed within the housing, with the circuit board including a circuit board processor and a multi-pin connector and the housing including an aperture for the connector. A cable disposed within the housing connects the computer and circuit board for communications there between. The circuit board is configured to receive vehicle data signals from an electrical system of a vehicle via the connector and convert the vehicle data signals for transmission to the computer via the cable, and wherein the computer is configured to transmit signals to the circuit board via the cable for conversion by the circuit board to vehicle data signals for transmission via the connector to the electrical system of the vehicle.

According to particular embodiments of the vehicle diagnostic device, the circuit board is configured to operate as a SAE J2534 pass-thru device, and the computer is a tablet computer with a touchscreen. Still further, the cable is a USB cable connected to USB connectors on the computer and circuit board. The vehicle diagnostic device is connectable to the electrical system of the vehicle by a communication cable.

In a further particular embodiment, the housing includes first and second housing members that are connected together to contain the computer, circuit board and cable within the housing. The first housing member may include the screen opening with the computer being mounted to the first housing member. Still further, the second housing member may include the aperture with the circuit board being mounted to the second housing member. The housing may be further configured to include one or more external handles.

According to a further particular embodiment the computer is operable to wirelessly transmit and receive signals from a remote diagnostic computer.

The vehicle diagnostic device of the present invention provides a convenient and portable integrated vehicle diagnostic tool for use in diagnosing, scanning and programming an electrical system of a vehicle. The utilization of a separate J2534 circuit board enables the vehicle diagnostic tool to be readily used with a wide variety of makes and models of vehicles, with the tablet computer providing an easy to use and convenient operator interface. These and other objects, advantages, purposes and features of this invention will become apparent upon review of the following specification in conjunction with the drawings.

BRIEF DESCRIPTION OF THE DRAWINGS

FIG. 4 is a right side edge view of the vehicle diagnostic device of FIG. 2;

FIG. 5 is a rear end view of the vehicle diagnostic device of FIG. 2;

FIG. 9 is a perspective view of the vehicle diagnostic device of FIG. 2 connected to the docking station of FIG. 8.

DESCRIPTION OF THE PREFERRED EMBODIMENTS

The present invention will now be described with reference to the accompanying figures, wherein the numbered elements in the following written description correspond to like-numbered elements in the figures.

Figure 1:
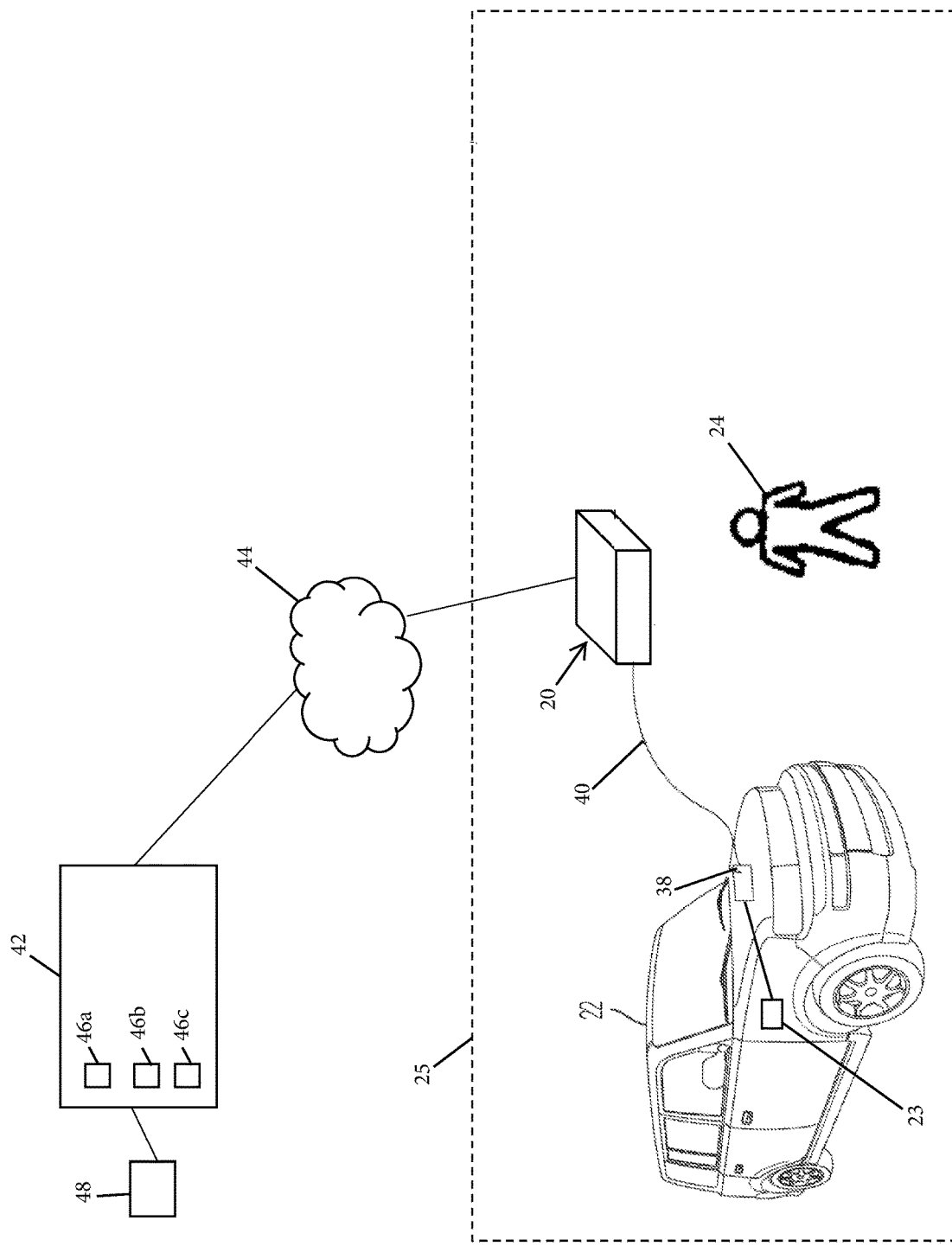
FIG. 1 is a schematic illustration of a vehicle diagnostic device in accordance with the present invention shown in use with a vehicle at a repair facility.
Figure 2:
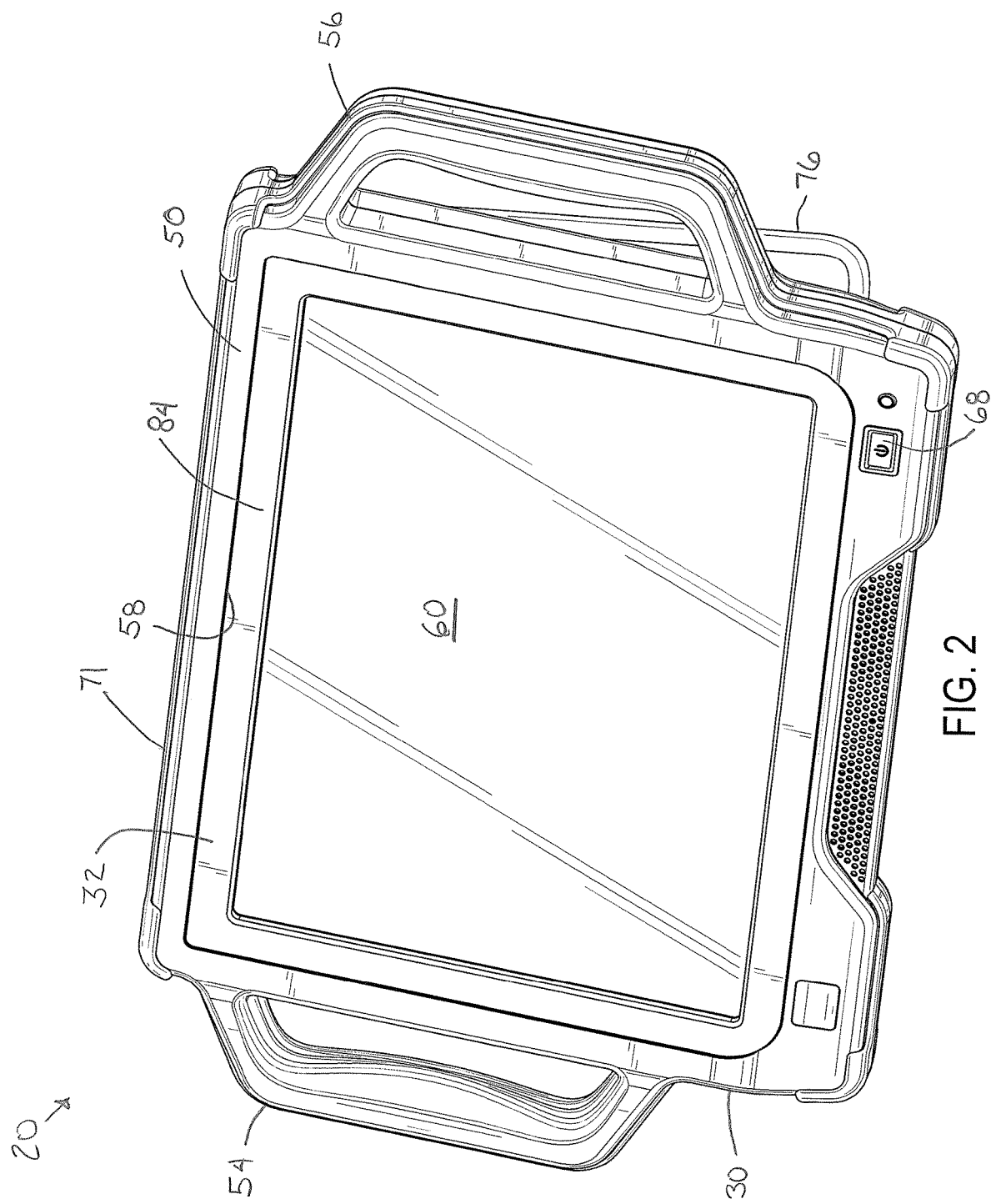
FIG. 2 is a front perspective view of a vehicle diagnostic device in accordance with the present invention.
Figure 6A:
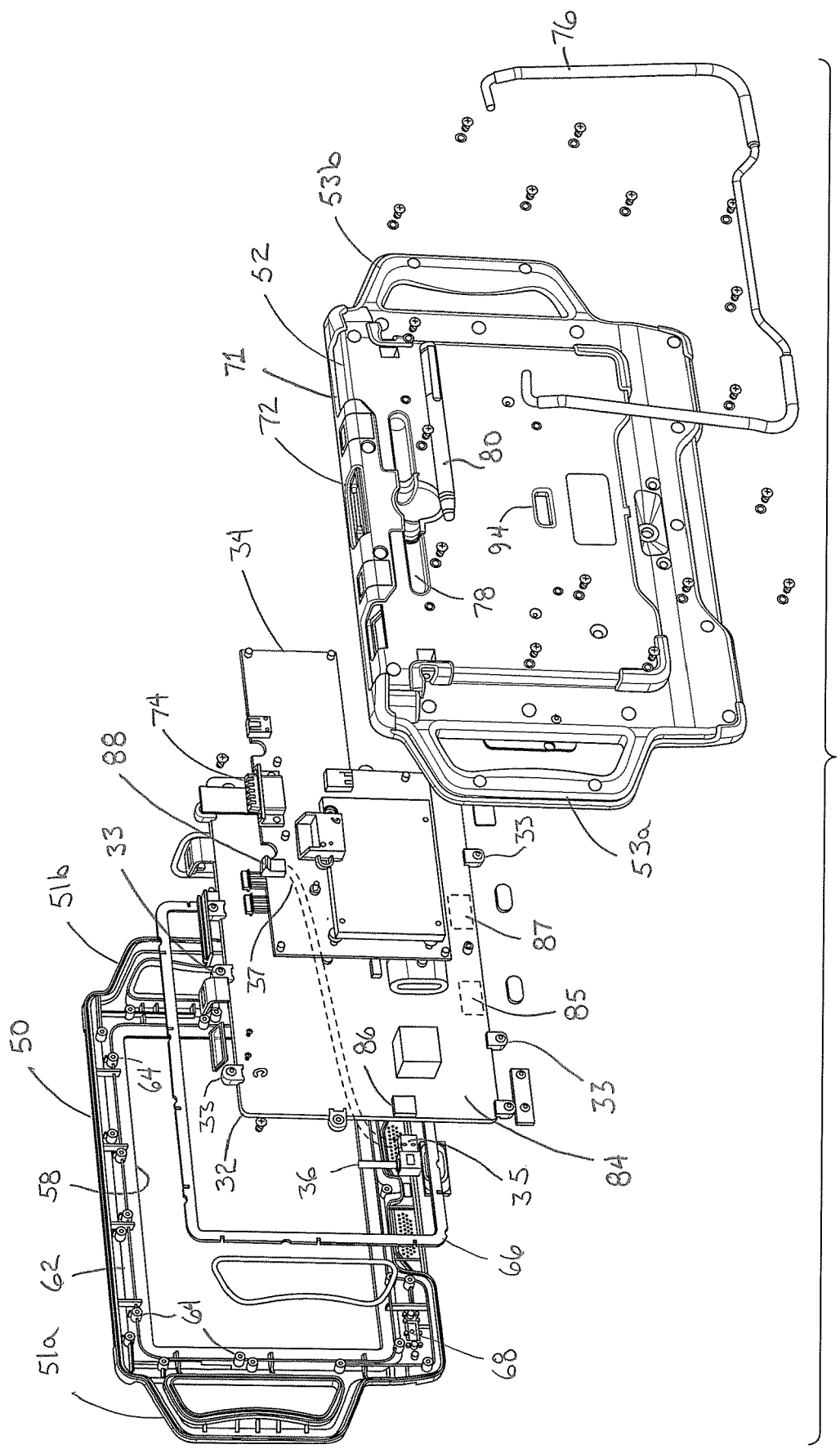
FIG. 6A is a rear exploded perspective view of the vehicle diagnostic device of FIG. 2.
Figure 7A:
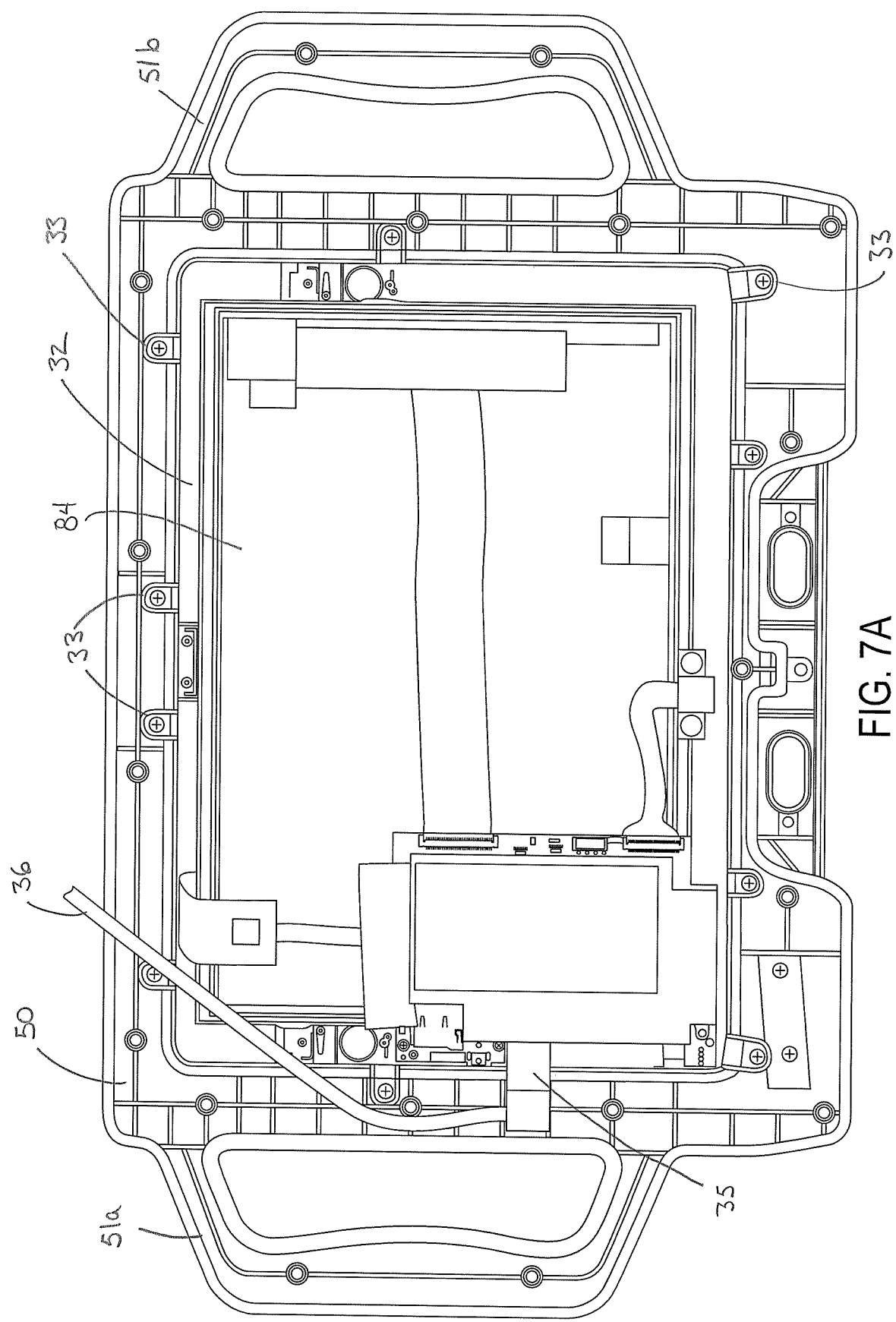
FIG. 7A is an internal plan view of the front half of the vehicle diagnostic device of FIG. 2.
Figure 7B:
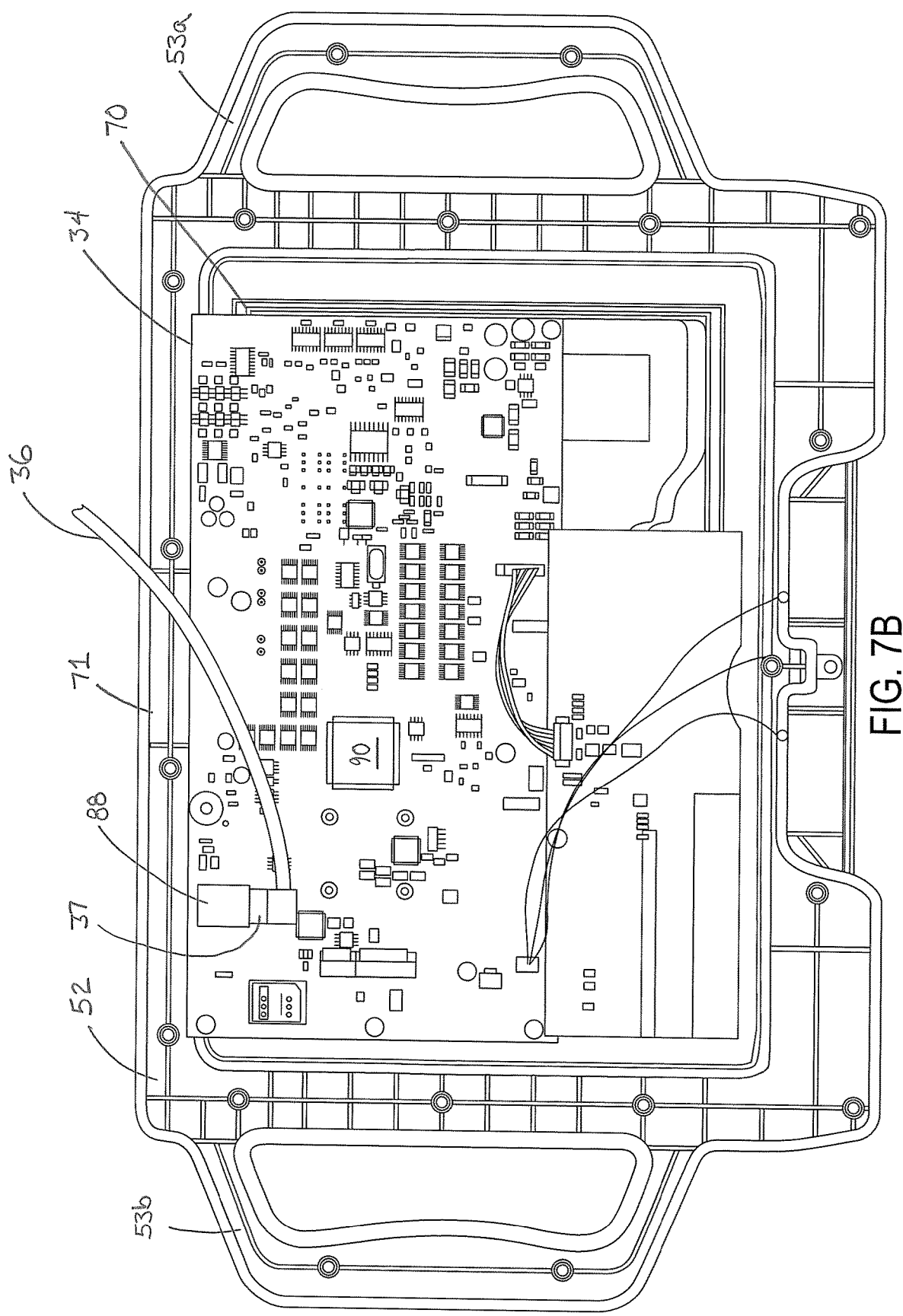
FIG. 7B is an internal plan view of the back half of the vehicle diagnostic device of FIG. 2.

With initial reference to FIGS. 1, 2 and 6A, a vehicle diagnostic device or tool 20 is shown that is used for the diagnosing, scanning and programming the electrical system 23 of a vehicle 22 by an operator 24 at a repair facility 25. Diagnostic tool 20 includes a housing 30 that contains a computer 32 and a separate computer module or circuit board 34, where a computer cable 36 (FIGS. 7A and 7B) is connected to both computer 32 and circuit board 34 to enable communication there between. In the illustrated embodiment, computer 32 is a tablet computer and circuit board 34 is configured to operate in accordance with Society of Automotive Engineers (SAE) J2534 standard as a conventional J2534 pass-thru device. Operator 24 is able to diagnose, scan and program electronic control units (ECUs) of the electrical system 23 using diagnostic tool 20 by connecting diagnostic tool 20 to the an on-board diagnostic ("OBD") diagnostic port 38 of vehicle 22 using cable 40, with diagnostic tool 20, in turn, either including diagnostic software applications thereon or being connected to a remote diagnostic computer 42 by way of an Internet connection 44, with the remote diagnostic computer 44 having or utilizing one or more diagnostic software applications 46a, 46b, 46c for the particular make and model of vehicle and being operated by a remote technician 48.

With reference now to FIGS. 2-7B, housing 30 in the illustrated embodiment comprises a front housing member 50 and a rear housing member 52 that are connected together in clam shell arrangement. Housing member 50 includes left and right handle portions 51a, 51b and housing member 52 includes left and right handle portions 53a, 53b (FIGS. 6A and 6B). When assembled, housing 30 thus includes left and right handles 54, 56, respectively. Diagnostic tool 20 is portable, with handles 54, 56 thus aiding in the portability of diagnostic tool 20, where in the illustrated embodiment diagnostic tool is approximately eight inches tall, by twelve inches wide and several inches thick. Housing members 50, 52 in the illustrated embodiment are constructed as molded components, with housing 30 additionally including in the illustrated embodiment various elastomeric pads disposed thereon, such as for aid in gripping and/or cushioning of tool 20.

Front housing member 50 includes a central opening 58 whereby the screen 60 of tablet computer 32 is accessible. Housing member 50 further includes an internal perimeter frame 62 disposed about opening 58 to which in the illustrated embodiment mounts 33 of tablet are secured via fasteners to retain tablet 32 to housing member 50, with a gasket 66 positioned there between. Front housing member 50 further supports a power button 68 for turning diagnostic tool 20 on and off.

Figure 3:
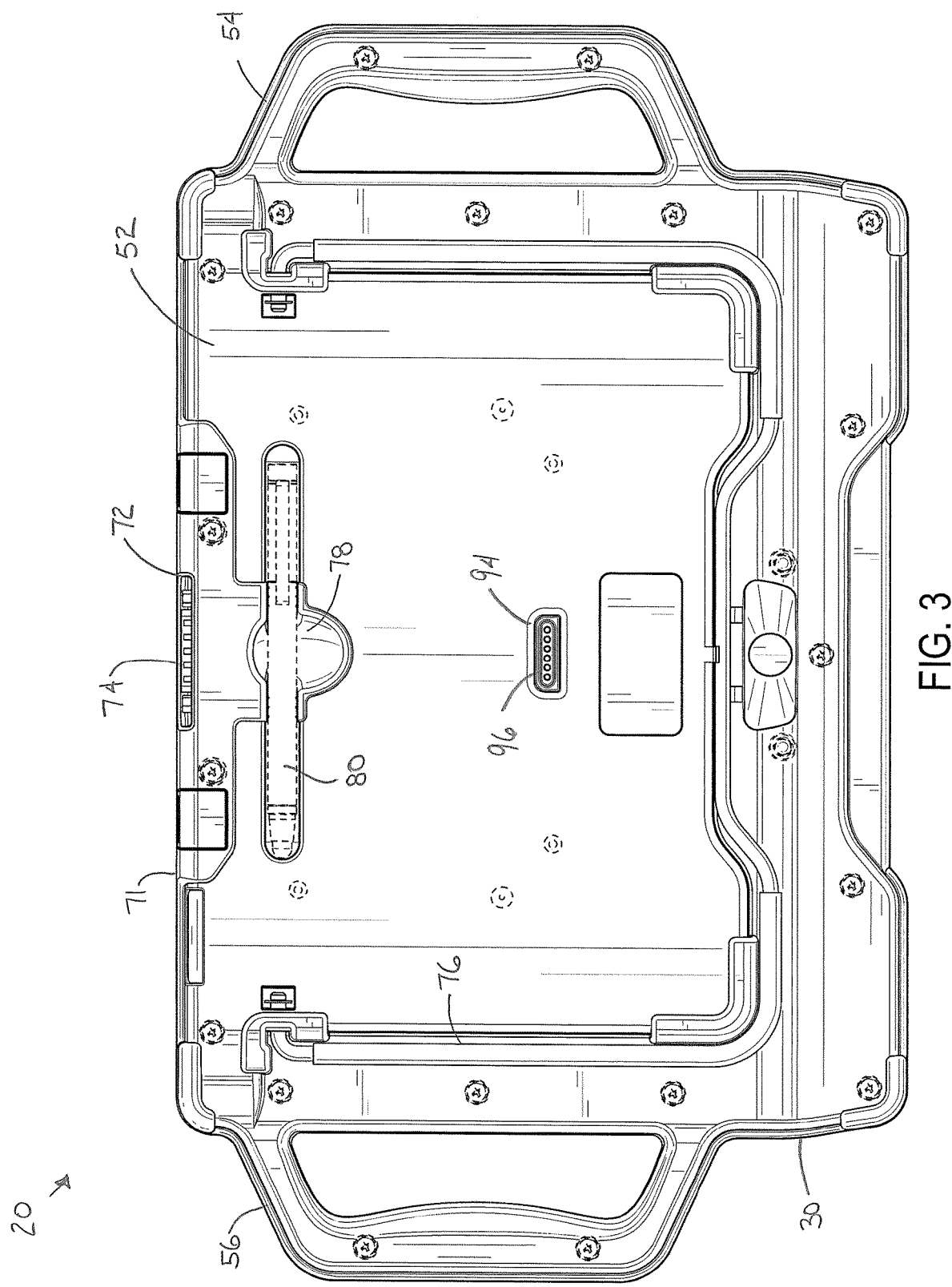
FIG. 3 is a rear plan view of the vehicle diagnostic device of FIG. 2.
Figure 6B:
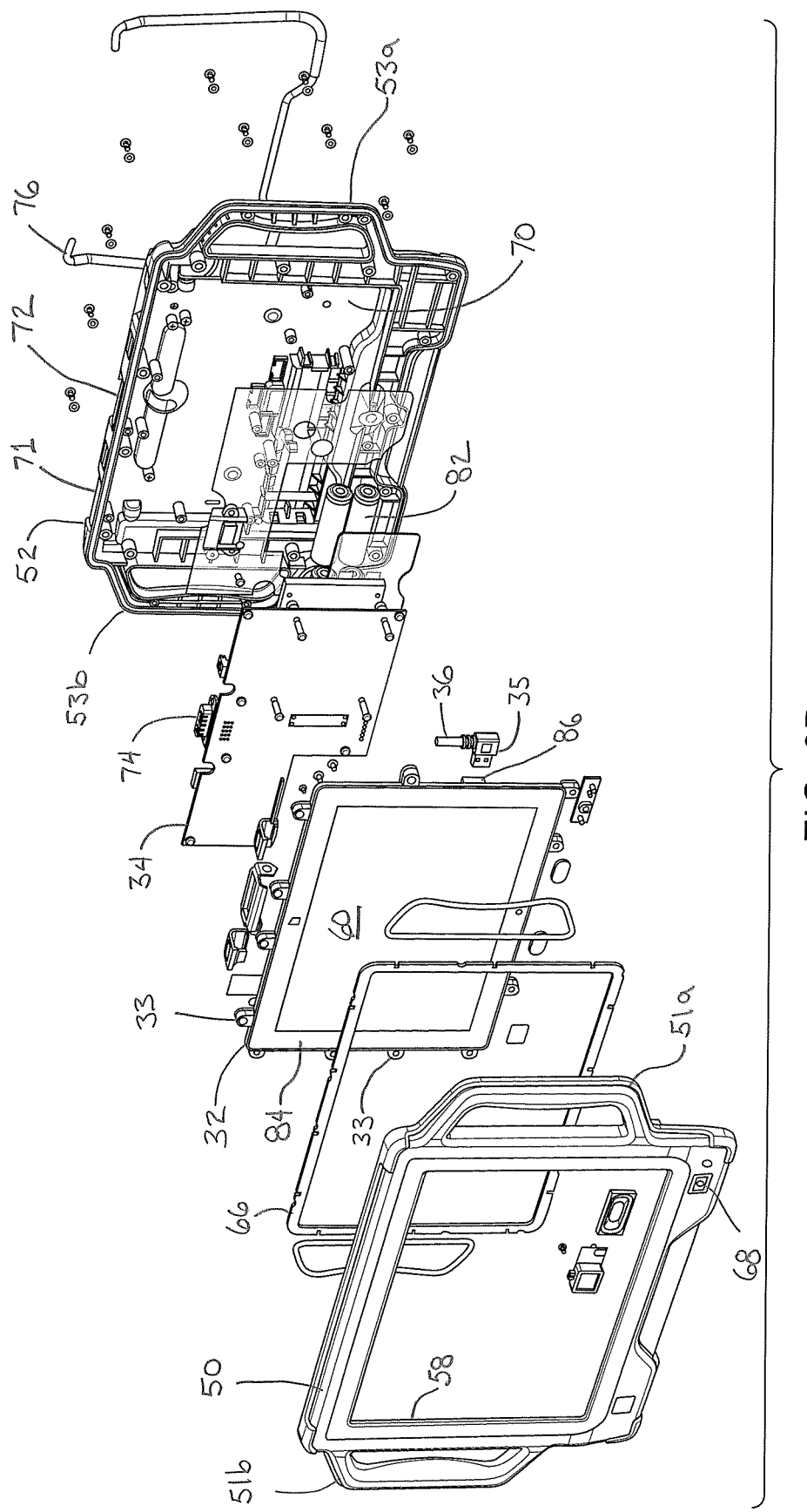
FIG. 6B is a front exploded perspective view of the vehicle diagnostic device of FIG. 2.

Rear housing member 52 includes an internal receptacle or cavity 70 for receiving the J2534 circuit board 34, where in the illustrated embodiment circuit board 34 is retained to housing member 52 by fasteners. A top or rear edge 71 of housing member 52 includes an aperture 72 through which a connector 74 mounted to the circuit board 34 is exposed. A pivoting stand 76 is secured to a rear or back surface 76. As shown in FIGS. 3 and 6A, a rear receptacle or cavity 78 is also included on back surface 76 for removably retaining a stylus 80 that is selectively retained within cavity 78 by an interference fit. Rear housing member 52 additionally supports rechargeable batteries 82 (FIG. 6B).

In the illustrated embodiment tablet computer 32 is a substantially conventional tablet computer with a touchscreen 60 and an outer case 84, as well as an internal circuit board supporting hardware and software, including one or more internal processors, such as an internal processor 85 disposed within case 84 (FIG. 6A). Computer 32 further includes an operating system and an internal wireless Internet module or chip 87, such as for WiFi communications (FIG. 6A). Tablet computer 32 also includes software for guiding an operator 24 through operational steps for diagnosing vehicle 22, with such diagnosing including scanning and/or reprogramming of the electrical system 23 of vehicle 22. When mounted within housing 30, and in particular when mounted to front housing member 50, touchscreen 60 is accessible via opening 58. In the illustrated embodiment opening 58 is sized so as to be smaller than the case 84 of tablet computer 32. As shown in FIGS. 6A and 6B, tablet 32 is provided with a connector or port 86 for connecting with one end 35 (FIGS. 6B and 7A) of cable 36 for communication there between with J2534 circuit board 34.

J2534 circuit board 34, in turn, includes a connector or port 88 for receiving the opposite end 37 (FIGS. 6A, 6B and 7B) of cable 36. In the illustrated embodiment cable 36 is a USB cable, with ends 35, 37 configured as USB connectors. Circuit board 34 also includes multiple hardware components, including at least one processor 90, as well as software. Circuit board 34 additionally includes the multi-pin connector or port 72 for connecting with cable 40 to communicate with electrical system 23 of vehicle 22. As understood from FIGS. 3 and 5, rear housing member 52 includes an opening 74 through which port 72 is accessible.

As noted, J2534 circuit board 34 is configured to operate in accordance with the SAE J2534 standard as a conventional J2534 pass-thru device. As such, circuit board 34 additionally includes a database of vehicle protocols in local memory on circuit board 34 that allow communication with the ECUs of various makes and models of vehicles. Still further, circuit board 34 is configured to receive vehicle data signals via cable 40 and port 92 and, based on a determined protocol of the vehicle data signals, convert the vehicle data signals to a J2534 protocol message for transmission to tablet computer 32. Likewise, circuit board 34 is operable to receive J2534 protocol messages from tablet computer 32 and convert such messages to vehicle data signals for delivery to the electrical system 23 of vehicle 22 via port 72 and cable 30. It should be appreciated that a J2534 protocol message comprises a message that is formatted into another protocol from the protocol of the vehicle data signals for use by the tablet computer 32. That is, different vehicle makes and models utilize differing protocols within their respective electrical systems, with the J2534 pass-thru device operating to convert those protocols into a protocol for use by the tablet computer 32.

Tablet computer 32 may include diagnostic software applications for use in diagnosing electrical system 23, including by way of scanning and programming ECUs of the electrical system 23. Alternatively, tablet computer 32 may transmit J2534 protocol messages to remote diagnostic computer 42, with remote diagnostic computer 42 including diagnostic software applications 46a-46c for use with different makes and models of vehicles 22 to diagnose, scan and reprogram electrical system 23 of vehicle 22. In such an embodiment, tablet computer 32 may communicate with remote diagnostic computer 42 by way of an Internet connection 44, with tablet computer 32 transmitting the J2534 protocol messages via a standard/conventional Internet transmittal protocol, such as via TCP/IP or UDP or the like. In turn, signals received by tablet computer 32 from remote diagnostic computer 42 may in turn be sent as J2534 protocol messages to circuit board 34, with circuit board 34 in turn converting the J2534 protocol messages to the appropriate vehicle data signals associated with the protocol of the electrical system 23 of the vehicle 22 under test and transmit the vehicle data signals to the electrical system 23 in conventional manner via port 92 and cable 40 connected with OBD port 38.

Figure 8:
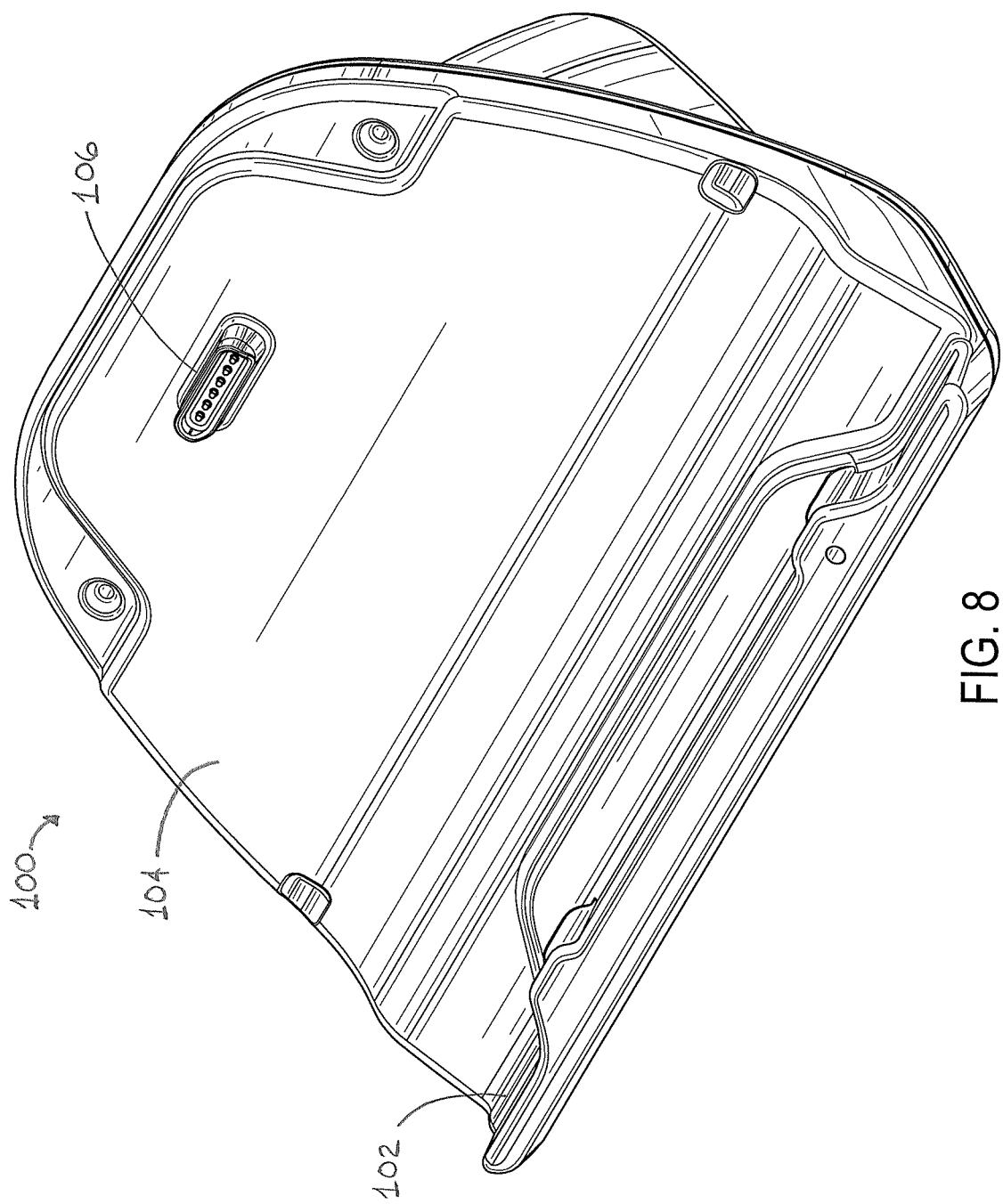
FIG. 8 is a perspective view of a docking station for the vehicle diagnostic device of FIG. 2.

As understood from FIGS. 3, 6A and 6B, rear housing member 52 includes an additional aperture 96 for exposing an internal connector 98 that enables recharging of batteries 82 and/or powering of vehicle diagnostic tool 20 separately from batteries 82. As understood from FIGS. 8 and 9, a docking station 100 may be provided for use with diagnostic tool 20, wherein docking station 100 includes a ledge 102 and an angled support surface 104 for supporting diagnostic tool 20. Docking station 100 further includes a power connector 106 that mates with internal connector 98 when diagnostic tool 20 is supported by docking station whereby power may be supplied to diagnostic tool 20 via docking station 100.

It should be appreciated that various configurations, constructions and arrangements of a vehicle diagnostic device or tool may be provided within the scope of the present invention. For example, alternatively configured and arranged housings may be used with vehicle diagnostic devices in accordance with the present invention, including with an alternatively configured handle or handles, or without handles. It should also be appreciated that the vehicle diagnostic device in accordance with the present invention may be configured for use with OBD 1 and/or OBD 2 systems. Further changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A vehicle diagnostic device for use in diagnosing, scanning and programming an electrical system of a vehicle, said vehicle diagnostic device comprising:
    a housing having a front and a back;
    a computer having a case, a screen joined with said case, a first cable connector, and a computer processor disposed within said case, wherein said computer is disposed within said housing with said housing including a screen opening at said front of said housing and said screen being disposed at said screen opening;
    a circuit board disposed within said housing between said computer and said back of said housing, said circuit board including a circuit board processor, a second cable connector, and a multi-pin connector with said housing including an aperture and said multi-pin connector being disposed at said aperture;
    a cable disposed within said housing and connecting said computer and said circuit board for communications there between with said cable being connected to said first cable connector and to said second cable connector;
    wherein said circuit board is configured to receive vehicle data signals from an electrical system of a vehicle via said multi-pin connector and convert said vehicle data signals for transmission to said computer via said cable, and wherein said computer is configured to transmit signals to said circuit board via said cable for conversion by said circuit board to vehicle data signals for transmission via said multi-pin connector to the electrical system of the vehicle.

2. The vehicle diagnostic device of claim 1, wherein said circuit board comprises a J2534 circuit board configured to operate as a SAE J2534 pass-thru device.

3. The vehicle diagnostic device of claim 2, wherein said J2534 circuit board includes a USB connector and wherein said cable comprises a USB cable connected to said J2534 circuit board at said USB connector.

4. The vehicle diagnostic device of claim 1, wherein said computer comprises a tablet computer and said screen comprises a touchscreen.

5. The vehicle diagnostic device of claim 4, wherein said first cable connector of said tablet computer comprises a USB connector and said cable comprises a USB cable connected to said USB connector of said tablet computer.

6. The vehicle diagnostic device of claim 1, wherein said housing includes a first housing member and a second housing member that are connected together to contain said computer, said circuit board and said cable within said housing.

7. The vehicle diagnostic device of claim 6, wherein said first housing member includes said screen opening and said computer is mounted to said first housing member.

8. The vehicle diagnostic device of claim 6, wherein said second housing member includes said aperture and said circuit board is mounted to said second housing member.

9. The vehicle diagnostic device of claim 6, wherein said housing includes at least one handle.

10. The vehicle diagnostic device of claim 1, wherein said computer is operable to wirelessly transmit and receive signals from a remote diagnostic computer.

11. The vehicle diagnostic device of claim 1, wherein said multi-pin connector is connectable to the electrical system of the vehicle by a communication cable.

12. A vehicle diagnostic device for use in diagnosing, scanning and programming an electrical system of a vehicle, said vehicle diagnostic device comprising:
    a housing having a front and a back;
    a tablet computer having a touchscreen joined with a case, a first cable connector, and a computer processor disposed within said case, said tablet computer disposed within said housing with said housing including a screen opening at said front of said housing and said touchscreen being disposed at said screen opening;
    a circuit board configured to operate as a SAE J2534 pass-thru device and disposed within said housing between said tablet computer and said back of said housing, said circuit board including a circuit board processor, a second cable connector, and a multi-pin connector with said housing including an aperture and said multi-pin connector being disposed at said aperture;
    a cable disposed within said housing and connecting said tablet computer and said circuit board for communications there between with said cable being connected to said first cable connector and to said second cable connector;
    wherein said circuit board is configured to receive vehicle data signals from an electrical system of a vehicle via said multi-pin connector and convert said vehicle data signals for transmission to said tablet computer via said cable, and wherein said tablet computer is configured to transmit signals to said circuit board via said cable for conversion by said circuit board to vehicle data signals for transmission via said multi-pin connector to the electrical system of the vehicle.

13. The vehicle diagnostic device of claim 12, wherein said cable comprises a USB cable.

14. The vehicle diagnostic device of claim 13, wherein said first cable connector of said tablet computer comprises a USB connector and said second cable connector of said circuit board comprises a USB connector, with said USB cable being connected to said tablet computer and said circuit board via said respective USB connectors of said tablet computer and said circuit board.

15. The vehicle diagnostic device of claim 14, wherein said second housing member includes said aperture and said circuit board is mounted to said second housing member.

16. The vehicle diagnostic device of claim 13, wherein said first housing member includes said screen opening and said tablet computer is mounted to said first housing member.

17. The vehicle diagnostic device of claim 12, wherein said housing includes a first housing member and a second housing member that are connected together to contain said tablet computer, said circuit board and said cable within said housing.

18. The vehicle diagnostic device of claim 12, wherein said housing includes a handle.

19. The vehicle diagnostic device of claim 18, wherein said housing includes another handle so as to have a pair of handles.

20. The vehicle diagnostic device of claim 12, wherein said tablet computer is operable to wirelessly transmit and receive signals from a remote diagnostic computer.

\* \* \* \* \*